United States Patent [19]

Moore et al.

[11] Patent Number: 4,629,033

[45] Date of Patent: Dec. 16, 1986

[54] POSITIVE DISPLACEMENT PUMP UTILIZED IN LUBE OIL SYSTEM FOR TURBOMACHINERY

[75] Inventors: James H. Moore; Sidney J. Woodcock, both of Schenectady; Charles R. Dumas, Scotia, all of N.Y.

[73] Assignee: General Electric Company, Schenectady, N.Y.

[21] Appl. No.: 625,764

[22] Filed: Jun. 28, 1984

[51] Int. Cl.$^4$ .................. F01D 25/20; F01M 1/02
[52] U.S. Cl. .................. 184/6.3; 184/6.4; 184/6.11; 184/27.2; 417/201
[58] Field of Search .................. 184/6.11, 27 A, 27 C, 184/6.3, 6.4; 60/39.08; 415/175; 417/201, 203, 205

[56] References Cited

U.S. PATENT DOCUMENTS

| | | | |
|---|---|---|---|
| 1,647,135 | 11/1927 | Johnson | 184/6.4 |
| 2,245,175 | 6/1941 | Bany | 184/6.4 X |
| 2,440,980 | 5/1948 | Sheppard | 415/110 |
| 4,446,377 | 5/1984 | Kure-Jensen et al. | 60/39.08 |

FOREIGN PATENT DOCUMENTS

| | | | |
|---|---|---|---|
| 1551222 | 4/1970 | Fed. Rep. of Germany | 184/6.3 |
| 443193 | 9/1974 | U.S.S.R. | 184/6.11 |

Primary Examiner—Leonard E. Smith
Attorney, Agent, or Firm—Jerome C. Squillaro

[57] ABSTRACT

Discloses a backup lube oil pump system for a steam turbine lube oil system. The primary and secondary pump system of the prior art lube oil system normally includes a primary centrifugal pump affixed to the turbine shaft and ac and dc motor-driven pumps to supply lubrication during start-up and shutdown when the primary pump cannot maintain flow due to low rotational speed. If the turbine is coasting down due to an ac power failure, the ac motor-driven backup pump is inoperative. The dc (battery) driven backup pump becomes the only backup left and the failure of batteries if not charged regularly can render it as a poor backup system. In the invention a backup lube oil system having high reliability utilizes a positive displacement lube oil pump driven by a rotor-driven permanent magnet generator. The pump is in parallel with a primary check valve in the lube oil feed line, so that the positive displacement backup lube oil pump is supplying oil at all times to the shaft bearing. Upon coast-down of the rotor, the PDP driven by the permanent magnet generator maintains a continuous flow of oil to the shaft bearings to a speed which is sufficiently low to prevent bearing damage in case the primary and other backup systems fail to do so.

12 Claims, 3 Drawing Figures

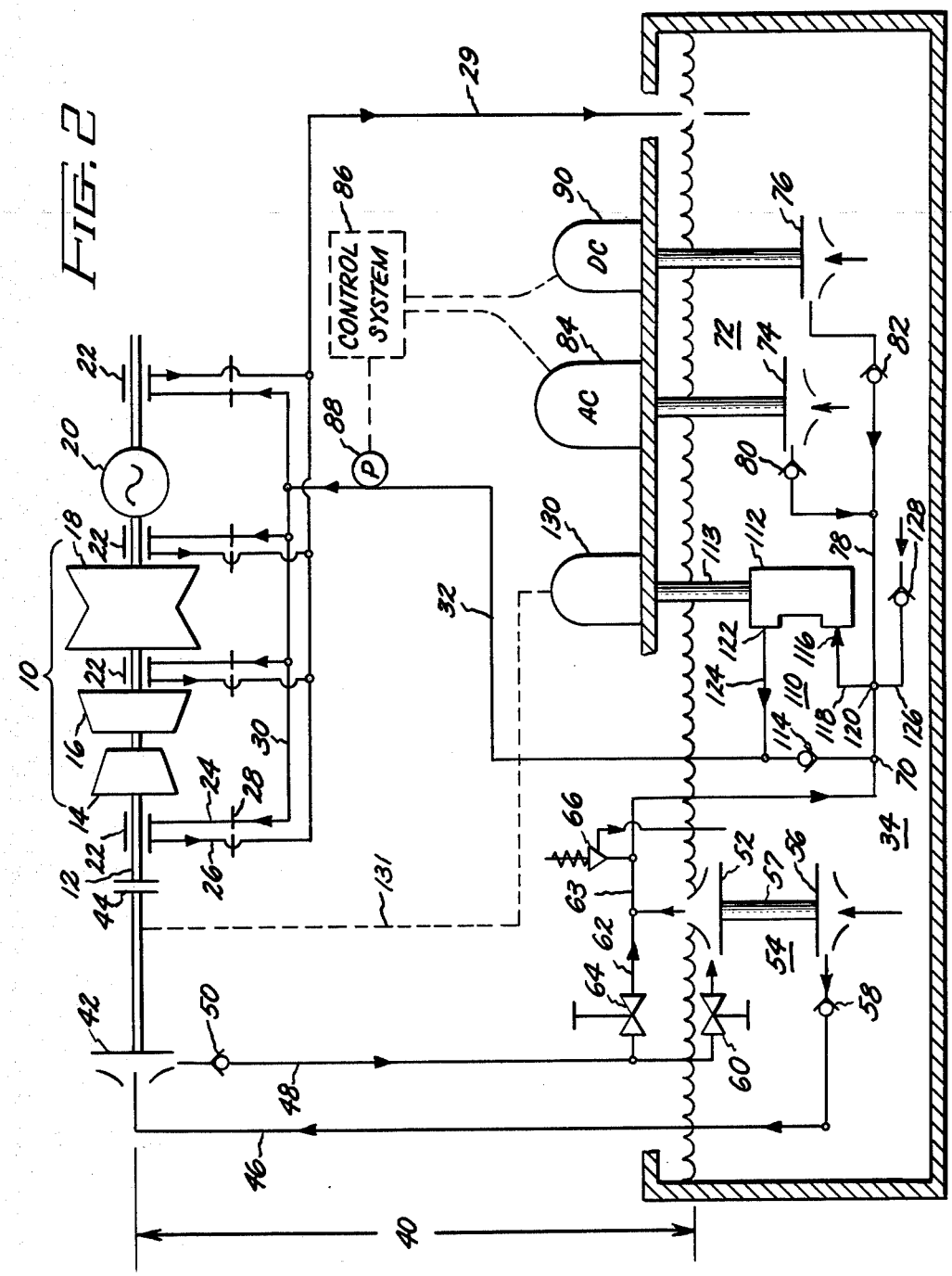

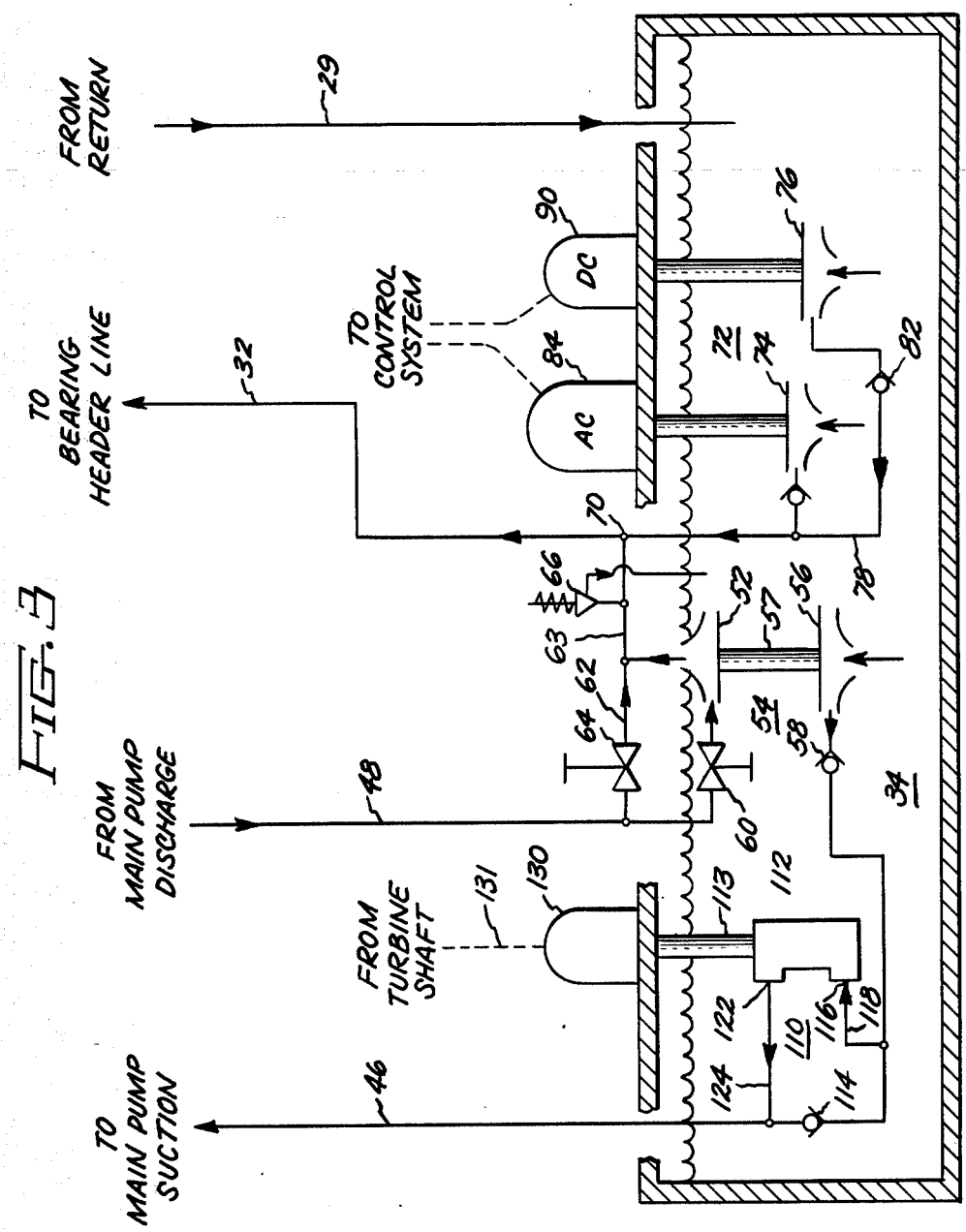

POSITIVE DISPLACEMENT PUMP UTILIZED IN LUBE OIL SYSTEM FOR TURBOMACHINERY

BACKGROUND OF THIS INVENTION

The present invention relates to lubrication oil systems for turbomachinery, such as steam turbines, and particularly relates to a secondary lubrication means utilizing a positive displacement pump.

Large turbomachines as, for example, large steam turbines, generally include a rotor shaft which is positioned and supported by a plurality of bearings axially spaced along the shaft. It is generally recognized that these bearings are flood lubricated with oil and the rotating shaft is supported by a film of oil present between the rotating shaft and the surface of the bearing. Commonly, the shaft is oriented horizontally with its weight supported by several journal bearings and its axial portion is maintained by a thrust bearing. It is well recognized in the art, that oil must be supplied to these bearings during substantially all operating phases of the turbine to maintain the integrity of the bearing surfaces in proximity to the shaft and to maintain the close clearances and tolerances between the turbine rotor and the stationary components of the turbine. The loss of a flow of oil to these bearings during any type of operation results in unacceptable consequences.

Several lubrication systems are currently utilized to supply oil to the bearings of large steam turbines. One prior art system utilizes a main shaft-driven pump as the primary source of pumping power in the lubrication system. This main pump is mechanically coupled to the rotor shaft and, hence, is driven by the shaft. This pump is normally a centrifugal pump which provides a sufficient flow of oil at a high pressure into its discharge line. Some turbines utilize a mechanical hydraulic control system for the control of the turbine. This mechanical hydraulic control system requires a high transient flow of oil to operate the control valves admitting motive steam to the turbine under transient conditions. A centrifugal main pump is capable of providing this high transient oil flow without substantial reduction in the head or oil pressure in the discharge line.

With the main shaft-driven pump located at the elevation of the centerline of the turbine, some means must be provided to supply oil from the oil reservoir at a lower level to the inlet of the main pump at sufficient pressure to satisfy suction pressure requirements of the main pump.

In one prior art lubrication oil system, oil at a high pressure in the main pump discharge line is utilized as motive fluid for a booster turbine/booster pump combination disposed in the oil reservoir. The booster pump has an input port in the oil reservoir and pumps oil into the main pump suction line which is fluidly connected to the input port of the main shaft-driven pump. High-pressure oil from the main oil pump outlet is fed into the booster turbine which mechanically drives the booster oil pump. In providing energy to drive the booster turbine a reduction in pressure occurs and therefore the oil exiting the booster turbine is at a lower pressure and is piped into a supply line which is fluidly connected to the bearing header and ultimately to the plurality of bearings. This prior art system is detailed fully in U.S. Pat. No. 2,440,980, Sheppard, the disclosure of which is incorporated herein by reference thereto.

The centrifugal main pump pumps oil through the lubrication system efficiently and reliably at turbine rated speed, without utilizing any other power source other than energy from the rotating shaft. However, a centrifugal main pump with an oil turbine-driven booster pump does not function when the rotational speed of the shaft drops below a predetermined value, normally about two-thirds of the design operating, or rated, speed of the turbine. As the speed of the main oil pump decreases, its discharge pressure decreases and, therefore, the speed and discharge pressure of the booster pump decreases. With the main oil pump speed below approximately two-thirds of design speed the discharge pressure of the booster pump is insufficient to overcome the increase in elevation in the line to the main pump inlet. As is recognized in the art, without sufficient suction pressure the main pump cavitates and its discharge pressure decreases even further, causing complete collapse of the system and cessation of oil flow. The adverse consequences of loss of lubricating oil flow to the bearings is well known in the art.

In further accord with the prior art lubrication system at least two additional centrifugal pumps whose outputs are fluidly connected to the supply line to the bearings of the turbine are used. One of these centrifugal pumps is driven by an ac motor and is used to supply oil to the bearings whenever the turbine is operating below the self-sustaining speed of the main oil pump/booster pump combination such as when the turbine is being started or shut down.

A control system including a pressure sensor in the lubricating oil supply line activates this ac motor-driven centrifugal pump when the pressure in the supply line falls below a predetermined point. Unfortunately, experience has shown that sometimes this ac motor-driven centrifugal pump does not begin pumping oil in time to maintain a sufficient flow of oil to the bearings. This may be because as the speed of the electric generator driven by the turbine and providing ac power for station auxiliaries decreases, a delay occurs in transferring to a source of ac power from outside the station. Also failure of such equipment as fuses and breakers can result in failure of the ac motor-driven pump to start.

The second centrifugal pump in the mentioned prior art is also fluidly connected to the lubrication oil supply line and is driven by a dc motor. The dc power source for such motor is normally a plurality of batteries on site at the power plant. A control system, similar in nature to that for the ac motor and centrifugal pump described above, actuates the dc motor centrifugal pump sub-system. However, field experience has shown that this dc motor-driven centrifugal pump does not always provide sufficient flow to the bearings of the turbine due to failure of the control system, intervention by the human operators of the turbine plant into the control system, failure of the dc power source, or interruption of the dc power source due to other occurrences at the turbine plant.

OBJECTS OF THE INVENTION

It is an object of this invention to provide for a secondary lubrication means which is always operating during all phases of turbomachine operation.

It is another object of the present invention to provide for a secondary lubrication means which provides a flow of oil through the supply line proportional to the rotational speed of the shaft of the turbomachine.

It is another object of this invention to provide a secondary lubrication means fluidly connected to the supply line which does not utilize ac power from the electric generator of the turbomachine nor dc power from the turbomachine plant.

It is a further object of this invention to provide for a secondary lubrication means which does not utilize a control system triggered by a pressure sensor in the lubrication oil supply line.

It is an additional object of the present invention to provide for a secondary lubrication means which does not increase the pressure of the lubricating oil in the supply line during normal operation nor adversely affect normal operation of the primary lubrication means.

It is another object of the present invention to provide for a secondary lubrication means tied into the supply line which is not subject to human operator control.

SUMMARY OF THE INVENTION

A secondary lubrication means, utilized in combination with a turbomachine having a primary lubrication means pumping oil up from an oil reservoir through a supply line to a plurality of bearings, includes a check valve in the supply line. A positive displacement pump is connected in parallel with the check valve and has its input and output fluidly connected to the supply line to pump oil towards the bearings of the turbomachine. A secondary suction line and a second check valve permits the drawing of oil from the oil reservoir into the supply line. This secondary suction line and second check valve is disposed upstream of the input of the positive displacement pump. The secondary lubrication means includes means for driving the positive displacement pump by utilizing, on a continuous basis, the rotational power of the shaft of the turbomachine. This driving means causes the positive displacement pump to maintain the flow of oil through the supply line substantially proportional to the rotational speed of the shaft at all operating speeds of the turbomachine. In this embodiment, the flow through the supply line is split between the first check valve and the positive displacement pump. Since the positive displacement pump is always operating when the shaft of the turbomachine is rotating, this pump always supplies a flow of oil to the supply line. During normal operation, the positive displacement pump does not increase the pressure in the supply line. However, upon collapse of the primary pumping system and concurrent failure of the motor-driven pumps to start, the positive displacement pump maintains an uninterrupted flow of oil to the bearings by drawing oil from the reservoir through the secondary suction line and discharging oil at a pressure sufficient to maintain oil flow.

BRIEF DESCRIPTION OF THE DRAWINGS

The subject matter which is regarded the invention is particularly pointed out and distinctly claimed in the concluding portion of the specification. The invention, however, together with further objects and advantages thereof, may best be understood by reference to the following description taken in connection with the accompanying drawings in which:

FIG. 2 is a schematic of the present invention utilizing a positive displacement pump as part of a secondary lubrication means in combination with the primary lubrication means and the turbomachine; and, FIG. 3 is an alternate embodiment of the present invention showing schematically a portion of a secondary lubrication system in combination with the primary lubrication system.

DETAILED DESCRIPTION OF THE INVENTION

Figure 1:
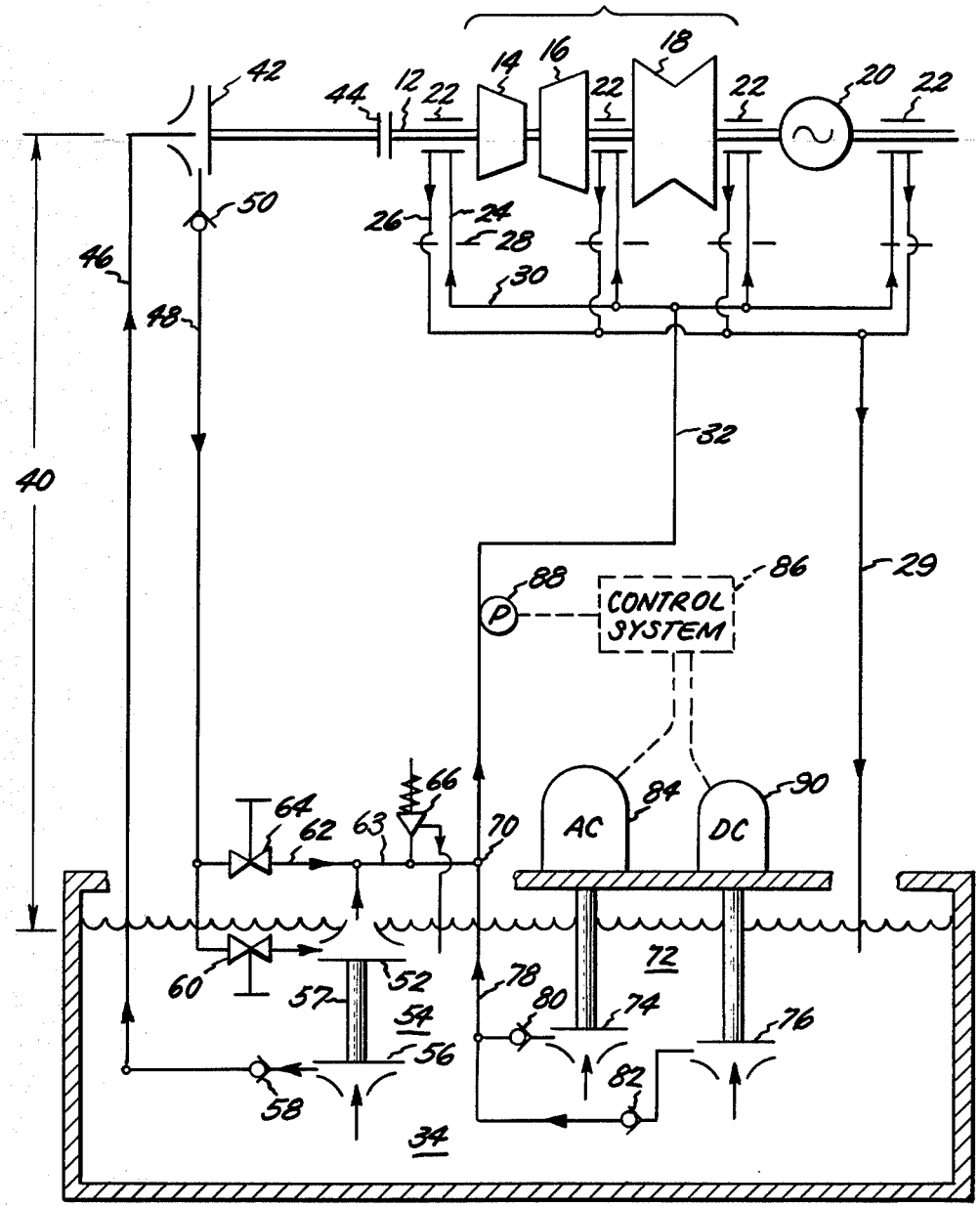
FIG. 1 is a schematic of a lubrication oil system for a turbomachine as is found in the prior art.

This invention relates generally to a secondary lubrication oil system utilized in combination with a primary lubrication system for a turbomachine, such as a large axial flow steam turbine-generator, and particularly relates to the utilization of a positive displacement pump as part of the secondary lubrication system.

FIG. 1 illustrates, in schematic form, a multi-stage steam turbine-generator set and a primary lubrication system therefor. Turbine 10 includes a central shaft 12. Shaft 12 is driven by turbine sections 14, 16 and 18. Shaft 12 is also coupled to the shaft and rotor of electric generator 20. As is well recognized in the art, a motive fluid such as steam is supplied to turbine sections 14, 16 and 18. The motive fluid is expanded as it passes through the respective stages and energy is extracted therefrom to cause shaft 12 to rotate and drive generator 20. A plurality of bearings, collectively referenced as bearings 22, position and support shaft 12. As is well recognized in the art, bearings 22 support and position shaft 12 on a film of oil between the shaft surface and the bearing surface proximate to the shaft. It should be recognized that shaft 12 may be a plurality of shafts coupled together and also that the positioning and number of bearings illustrated in all the figures is only exemplary in nature. The bearings are of the type generally used in axial flow elastic fluid turbines and are oil-lubricated as is known in the art.

Each bearing 22 is supplied with a flow of oil through its respective conduit 24 and the oil is drained from each bearing 22 by its respective return conduit 26. Orifice 28 on conduit 24 restricts the flow of oil to the associated bearing. In FIG. 1, only one supply conduit, return conduit and orifice is identified numerically; however, the other bearings have substantially similar items associated with those devices as schematically illustrated in all the figures. Supply conduit 24 is fluidly connected to line 30 as are the balance of the supply conduits. Line 30 is in turn fluidly connected to supply line 32 which carries lubricating oil up from an oil reservoir 34. Supply line 32 is part of the primary lubrication means. Return conduit 26 is fluidly connected to return line 29 which carries the oil from the return conduits to oil reservoir 34.

Oil reservoir 34 is normally at a lower elevation than shaft 12 as noted by distance 40 in FIG. 1. A primary lubrication means includes a shaft-driven main pump 42 connected to shaft 12 by coupling 44. Main pump 42 is normally a centrifugal pump. The inlet of main pump 42 is fluidly connected to main pump suction line 46 and the pump's outlet is fluidly connected to main pump discharge line 48 through a check valve 50.

When the rotational speed of shaft 12 exceeds a predetermined value, generally two-thirds the normal operating speed of turbine 10, the oil in line 48 is at a relatively high pressure. As an example, turbine 10 and electric generator 20 operate at 3600 rpm and pump 42 operates effectively at speeds exceeding 2400 rpm. This high-pressure oil is fed into a booster turbine 52 which is part of a booster turbine/booster pump 54. Booster turbine/booster pump 54 has a pump portion 56. The high-pressure oil in line 48 is the motive fluid for the turbine portion 52. Shaft 57 mechanically couples turbine 52 to pump 56 and conveys motive force to that pump. In this fashion, booster turbine/booster pump 54 draws oil from reservoir 34 into pump 56 and subsequently into main pump suction line 46 through a check valve 58. A complete description of the booster turbine/booster pump and main pump primary lubrication system is disclosed in U.S. Pat. No. 2,440,980, the disclosure of Sheppard which is incorporated herein by reference thereto. Valve 60 controls the flow of oil into the booster turbine 52. A bypass line 62 provides for the diversion of some of the flow of oil from line 48 through a bypass valve 64. The lubricating oil exiting turbine portion 52 is added to the flow of oil in bypass line 62. Bypass line 62 is fluidly connected to supply line 32 through line 63 at coupling 70. A relief valve means 66 is schematically illustrated in line 63.

The prior art lubrication system schematically illustrated in FIG. 1 includes a backup lubrication system 72. Briefly, backup system 72 includes two centrifugal pumps 74 and 76 each having their outputs fluidly connected to backup line 78 through individual check valves 80 and 82 corresponding to pumps 74 and 76, respectively. Pump 74 is driven by an ac motor 84. Ac motor 84 is controlled by control system 86 which utilizes at least a signal from pressure sensor 88. When the oil pressure in supply line 32 falls below a predetermined value, control system 86 activates ac motor 84, thereby starting and driving pump 74 and causing oil to be supplied through backup line 78 to supply line 32 and ultimately to bearings 22. However, field experience has shown that the power source for ac motor 84 is not always reliable. Therefore, another part of backup system 72 used in the prior art is centrifugal pump 76 driven by dc motor 90 which is supplied with power from a dc source, commonly a plurality of batteries at the turbomachine plant site. Generally, dc motor 90 is activated by control system 86 in a substantially similar fashion. It is to be recognized that the description herein of backup lubrication system 72 is not meant to be complete. It is well known in the art to utilize a number of different backup lubrication systems which include ac and dc motors coupled to centrifugal pumps as well as steam-driven turbopumps which are actuated by similar control systems or completely independent control systems and/or power sources. The description herein is meant to be illustrative of a generalized turbine primary lubrication system and a backup lubrication system. Also, a person of ordinary skill in the art would recognize that booster turbine/booster pump 54 could be an eductor or jet pump rather than a turbine-driven centrifugal pump.

Not shown in any of the figures is an oil line connected to the main pump discharge line 48 which supplies high-pressure oil to the mechanical hydraulic control system of the turbine. Also not shown is an additional centrifugal pump, usually ac motor-driven, whose discharge line connects into the main pump discharge line 48 through a check valve. This auxiliary pump is used in starting the turbine and provides high-pressure oil to the mechanical hydraulic control system and to drive the booster turbine when the discharge pressure of the main pump is insufficient.

FIG. 2 illustrates, in schematic form, the present invention for a secondary lubrication system in combination with the primary lubrication system and turbine 10. Similar numerals designating similar items in FIG. 1 have been carried forward in FIG. 2 as well as into FIG. 3. The essence of secondary lubrication system 110 lies in the utilization of a positive displacement pump 112 in parallel with check valve 114 in supply line 32. Check valve 114 is in close proximity to oil reservoir 34 and is schematically illustrated as being physically located in reservoir 34. An input 116 to pump 112 is fluidly connected to a point upstream of check valve 114. The designations "upstream" and "downstream" herein refer to the item's position relative to the flow of lubricating oil through the system as shown by the arrows in FIGS. 1, 2 and 3. An output 122 of pump 112 is fluidly connected to line 124, which in turn, is fluidly connected downstream of check valve 114. A secondary lubrication suction line 126 is fluidly connected to input 116 through line 118 and coupling 120. Secondary suction line 126 is part of means for permitting the drawing of oil from the oil reservoir into the supply line upstream of input 116 of positive displacement pump 112. Check valve 128 in line 126 prohibits the opposite flow of oil through line 126 from supply line 32 or backup line 78. A person of ordinary skill in the art would recognize that the placement of line 126 and check valve 128 can be altered to any position upstream of input 116 of pump 112. It should be noted that any means for permitting the drawing of oil from the oil reservoir into the input 116 of positive displacement pump 112 could be utilized for the present invention.

Positive displacement pump 112 is mechanically coupled to driving means 130. Driving means 130 utilizes, on a continuous basis, the rotational power of shaft 12. A variety of driving means could be utilized; however, in a preferred embodiment a permanent magnet generator operatively coupled to shaft 12 of turbomachine 10 and electrically coupled to an induction motor, which in turn is mechanically coupled by shaft 113 to pump 112 is employed. Such a system is fully disclosed in a patent application entitled "Low Collapse Speed Lube Oil Pumping System for Turbomachinery", U.S. patent application Ser. No. 374,416, filed May 3, 1982, by Jens Kure-Jensen and Robert Marshall, which disclosure is incorporated herein by reference thereto. Other driving means such as a pump and hydraulic motor combination fluidly linked to convert the rotational power of shaft 12 and drive pump 112 or a mechanical system utilizing belts or shafting could also be utilized to practice the present invention. Coupling of shaft 12 to driving means 130 is illustrated schematically by dashed line 131.

Since driving means 130 utilizes, on a continuous basis, the rotational power of shaft 12, positive displacement pump 112 maintains a flow of oil through supply line 32 substantially proportional to the rotational speed of shaft 12 during all operating phases of turbomachine 10. The important distinction between a positive displacement pump and a centrifugal pump is that the positive displacement pump provides an output flow substantially proportional to its speed and that output flow is not significantly affected by the pressure downstream of the pump. In contrast, the flow output from a centrifugal pump is affected by the pressure downstream of the pump as well as by its speed. One positive displacement pump which could be utilized with this invention is the DeLaval IMO ® pump from Transamerica DeLaval Inc. One unique feature of the present invention is that the flow through supply line 32 is split at coupling 70. In a typical embodiment approximately one-half the flow passes through check valve 114 and the balance of the flow passes through positive displacement pump 112. In this fashion, as long as either the primary lubrication system or the backup lubrication system is operating properly, this divided flow assists in the driving of pump 112 and substantially lowers, if not eliminates, the power required by pump 112 which is supplied by driving means 130 and ultimately by shaft 12. The positive displacement pump is not sized for the full-flow capacity of the primary pumping system but only for the lower flow required by the bearings for safe shutdown below the speed at which the primary pumping system collapses. As is well known in the art, the required flow of lubricating oil to the bearings is substantially reduced at reduced speed of the shaft. Another unique feature is that pump 112 continually operates as long as shaft 12 is rotating. To eliminate any human operator error, driving means 130 is permanently connected to shaft 12 without any intervening control systems. A person of ordinary skill in the art would recognize the elimination of such a control system would improve the reliability of this secondary lubrication means.

FIG. 3 illustrates an alternative embodiment of the invention wherein pumping system 110 is coupled to main pump suction line 46. The operation of positive displacement pump 112, driving means 130, and check valve 114 is substantially similar to that as described with respect to FIG. 2. In this alternative embodiment the positive displacement pump serves to maintain oil flow to the inlet of the main oil pump. With a positive flow of oil maintained in suction line 46, the main oil pump is capable of developing a pressure rise and supplying oil to the bearings even at very low speed. The self-sustaining speed of the primary pumping system is thereby reduced from approximately two-thirds of the design operating speed to a value low enough for safe shutdown without damage to the bearings 22.

It is to be understood that the claims appended hereto are meant to cover all the modifications readily apparent to those of ordinary skill in the art and those modifications specifically called out herein.

What is claimed is:

1. In combination with a turbomachine having a central rotatable shaft and primary lubrication means having an output coupled to a supply line, the primary lubrication means for pumping lubricating oil from an oil reservoir against a predetermined head through the supply line to a plurality of bearings, the plurality of bearings for supporting and positioning said shaft, said primary lubrication means coupled to said shaft and for pumping oil against said predetermined head only when the rotational speed of said shaft exceeds a predetermined value, secondary lubrication means comprising:
   a first check valve coupled to said supply line downstream the output of the primary lubrication means, the first check valve for preventing oil from flowing from said supply line into said oil reservoir;
   a positive displacement pump having an oil input and an oil output fluidly connected to said supply line upstream and downsteam of said first check valve, respectively, whereby the combination of said first check valve and said positive displacement pump is disposed in series with the output of said primary lubrication means, such that oil from the output of said primary lubrication means flows through said first check valve and said positive displacement pump;
   supply means fluidically coupled to the supply line between the output of the primary lubrication means and the oil input of the positive displacemenet pump and further fluidically coupled to the oil reservoir, the supply means for permitting the drawing of oil from said oil reservoir into said supply line while prohibiting flow of oil through said supply means into said reservoir; and
   driving means coupled to said shaft and to said positive displacement pump for operating said positive displacement pump whenever the shaft is rotating, whereby said positive displacement pump maintains a flow of oil to said plurality of bearings substantially proportional to the rotational speed of said shaft during all operating phases of said turbomachine.

2. The combination as in claim 1, wherein said primary lubrication means includes a centrifugal pump mechanically coupled to said shaft, the centrifugal pump having an inlet fluidly connected to a first suction line and an outlet; and
   booster means having a booster turbine portion and booster portion, said booster turbine portion having an input coupled to the outlet of the centrifugal pump for being driven by the motive force of oil from the outlet of said centrifugal pump and said booster pump operated by said booster turbine and, said booster pump for drawing oil from said oil reservoir into said first suction line towards said centrifual pump, the booster turbine further including an output coupled to the supply line upstream the input of the positive displacement pump so that the oil exiting said booster turbine is provided to said supply line.

3. The combination as in claim 1 or 2, wherein said supply means includes a second suction line fluidly connected to said supply line upstream said input of said positive displacement pump, said second suction line fluidically coupled to said oil reservoir; and
   a second check valve coupled to said second suction line, said second check valve prohibiting oil to flow through said second suction line into said oil reservoir.

4. The combination as in claim 3, wherein said driving means includes a permanent magnet generator operatively coupled to said shaft and driven thereby to produce an electrical output; and
   an induction motor connected to the electrical output of said permanent magnet generator, said induction motor mechanically coupled to said positive displacement pump for operating said positive displacement pump.

5. In combination with a turbomachine having a central rotatable shaft supported and positioned by a plurality of bearings, lubrication means comprising:
   a lubrication oil reservoir disposed at a lower elevation than said shaft of said turbomachine;
   a supply line fluidly connected to said bearings for delivering lubricating oil to said bearings;
   a centrifugal pump mechanically coupled to said shaft and having an inlet fluidly connected to a suction line and an outlet coupled to said supply line, said centrifugal pump for pumping oil from said reservoir to said plurality of bearings only so long as the rotational speed of said shaft exceeds a predetermined value;
   booster means having a booster turbine portion and a booster pump portion, said booster turbine having an input coupled to the outlet of the centrifugal pump for being driven by the motive force of oil from the outlet of said centrifugal pump and said booster pump being mechanically connected to and driven by said booster turbine, and said booster pump for pumping oil from said reservoir into said suction line toward said centrifugal pump, the booster turbine further including an output coupled to the supply line so that oil exiting said booster turbine is provided to said supply line;

a first check valve coupled to said supply line downstream the output of the booster turbine, the first check valve for preventing oil from flowing from said supply line into said reservoir;

a positive displacement pump having an inlet and an outlet fluidly connected to said supply line upstream and downstream of said first check valve, respectively, whereby the combination of said first check valve and said positive displacement pump is disposed in series with the outlet of said centrifugal pump, such that oil from the output of said centrifugal pump flows through said first check valve and said positive displacement pump;

a second check valve coupled to said supply line upsteam the inlet of said positive displacement pump for permitting the drawing of oil from said oil reservoir into said supply line while prohibiting flow of oil from said supply line to said reservoir;

driving means coupled to said shaft and to said positive displacement pump for operating said positive displacement pump whenever the shaft is rotating, whereby said positive displacement pump maintains a flow of oil to said plurality of bearings substantially proportional to the rotational speed of said shaft during all operating phases of said turbomachine.

6. The combination as in claim 5, wherein said driving means includes a permanent magnet generator operatively coupled to said shaft and driven thereby to produce an electrical output; and an induction motor connected to the electrical output of said permanent magnet generator, said induction motor mechanically coupled to said positive displacement pump for operating said positive displacement pump.

7. In combination with a turbomachine having a central rotatable shaft and primary lubrication means for drawing lubrication oil through a suction line from an oil reservoir and pumping said oil through a discharge line to booster means, said booster means including a pump device for pumping oil into said suction line and a turbine device coupled to said pump device for utilizing the motive power of the flow of oil through said discharge line to operate said pump device, the oil exiting the turbine device of said booster means through a supply line to a plurality of bearings, the plurality of bearings for supporting and positioning said shaft, said primary lubrication means being driven by said shaft and for pumping said oil through said discharge line only so long as the rotational speed of said shaft exceeds a predetermined value, secondary lubrication means comprising:

a first check valve coupled to in said suction line for preventing oil from flowing from said suction line into said oil reservoir;

a positive displacement pump having an oil input and an oil output fluidly connected to said suction line upstream and downstream of said first check valve, respectively;

a second check valve coupled to said suction line upstream the oil input of the positive displacement pump, said second check valve for permitting drawing of said oil from said oil reservoir into said suction line and for prohibiting flow of oil from said suction line into said reservoir; and driving means coupled to said shaft and to said positive displacement pump for operating said positive displacement pump whenever the shaft is rotating, whereby said positive displacement pump maintains a flow of oil to said primary lubrication means substantially proportional to the rotational speed of said shaft during all operating phases of said turbomachine.

8. The combination as in claim 7, wherein said driving means includes a permanent magnet generator operatively coupled to said shaft and driven thereby to produce an electrical output; and an induction motor connected to the electrical output of said permanent magnet generator, said induction motor mechanically coupled to said positive displacement pump for operating said positive displacement pump.

9. In combination with a turbomachine having a rotatable shaft, the shaft supported by a plurality of bearings, bearing lubrication means comprising:

primary lubrication means having an input for receiving lubricant from a source of lubricant and an output for supplying lubricant from the source of lubricant to said plurality of bearings;

secondary lubrication means having an input for receiving lubricant from the source of lubricant and an output for supplying lubricant from the source of lubricant to said plurality of bearings;

a positive displacement pump having an inlet and an outlet, the inlet fluidically coupled to the output of said primary and secondary lubrication means and the outlet fluidically coupled to said plurality of bearings; and a check valve fluidically coupled in parallel across the inlet and outlet of said positive displacement pump and further disposed so that lubricant does not flow from the outlet to the inlet of said pump through said check valve, whereby a respective first portion of lubricant flow from the output of said primary and secondary lubrication means flows through said check valve and a respective second portion of lubricant flow from the output of said primary and secondary lubrication means flows through said positive displacement pump before encountering said plurality of bearings;

wherein said positive displacement pump is coupled to said shaft so that said positive displacement pump operates whenever said shaft rotates, whereby said positive displacement pump increases the pressure of lubricant flowing from its inlet to its outlet only when both the primary and the secondary lubrication means fail to provide adequate lubricant flow to said plurality of bearings.

10. The combination as in claim 9, wherein the secondary lubrication means is operative only when lubricant supplied from the primary lubrication means is less than a predetermined value.

11. The combination as in claim 10, wherein said secondary lubrication means includes an electrical alternating current driven pump and an electrical direct current driven pump.

12. The combination as in claim 11, wherein the AC driven pump is operative only when lubricant supplied from the primary lubrication means to the plurality of bearings is less than the predetermined value and further wherein the DC driven pump is operative only when lubricant supplied from the primary lubrication means and from the AC driven pump to the plurality of bearings is less than the predetermined value.

* * * * *